United States Patent
Kim et al.

(10) Patent No.: US 10,983,345 B2
(45) Date of Patent: Apr. 20, 2021

(54) HEAD-MOUNTED DEVICE AND DISPLAY DEVICE

(71) Applicant: Samsung Display Co., Ltd., Yongin-si (KR)

(72) Inventors: Kiseo Kim, Suwon-si (KR); Jae-kyoung Kim, Goyang-si (KR)

(73) Assignee: Samsung Display Co., Ltd., Yongin-si (KR)

(*) Notice: Subject to any disclaimer, the term of this patent is extended or adjusted under 35 U.S.C. 154(b) by 486 days.

(21) Appl. No.: 15/415,648

(22) Filed: Jan. 25, 2017

(65) Prior Publication Data

US 2017/0276944 A1    Sep. 28, 2017

(30) Foreign Application Priority Data

Mar. 23, 2016 (KR) .................. 10-2016-0034810

(51) Int. Cl.
*G02B 27/01* (2006.01)
*G02B 26/00* (2006.01)

(52) U.S. Cl.
CPC ....... *G02B 27/0172* (2013.01); *G02B 26/007* (2013.01); *G02B 27/0176* (2013.01); *G02B 2027/0112* (2013.01); *G02B 2027/0132* (2013.01)

(58) Field of Classification Search
CPC ............ G02B 27/0172; G02B 27/0176; G02B 26/007; G02B 2027/0112; G02B 2027/0132
USPC ............................ 359/480, 490.02, 889, 891
See application file for complete search history.

(56) References Cited

U.S. PATENT DOCUMENTS

| | | | | |
|---|---|---|---|---|
| 3,679,297 A | * | 7/1972 | Searle | G02B 27/01 353/14 |
| 4,744,633 A | * | 5/1988 | Sheiman | G02B 27/26 351/201 |
| 4,940,323 A | * | 7/1990 | Downing | A61B 5/161 351/203 |
| 5,488,496 A | * | 1/1996 | Pine | G02F 1/133308 349/58 |
| 5,488,510 A | * | 1/1996 | Lemay | G02B 27/22 348/44 |
| 5,506,705 A | * | 4/1996 | Yamamoto | G02B 27/017 349/13 |

(Continued)

FOREIGN PATENT DOCUMENTS

| | | |
|---|---|---|
| CN | 1252133 A | 5/2000 |
| CN | 1667462 A | 9/2005 |

(Continued)

OTHER PUBLICATIONS

Chinese Office Action dated Jun. 18, 2020, for corresponding Chinese Patent Application No. 201710176938.2 (13 pages).

*Primary Examiner* — Ricky D Shafer
(74) *Attorney, Agent, or Firm* — Lewis Roca Rothgerber Christie LLP

(57) ABSTRACT

A head-mounted device includes a case including a body and a cover covering the body, the case having a display panel accommodating space between the body and the cover, an optical system in the body facing the cover, and a filter in the body, the filter being spaced apart from the optical system in a first direction corresponding to a thickness direction of the optical system and being configured to repeatedly move in a direction.

13 Claims, 13 Drawing Sheets

(56) References Cited

U.S. PATENT DOCUMENTS

| | | | |
|---|---|---|---|
| 5,880,773 A * | 3/1999 | Suzuki | G02B 7/12 |
| | | | 345/8 |
| 6,072,632 A | 6/2000 | Ophey | |
| 6,330,121 B1 * | 12/2001 | Kobayashi | G02B 5/04 |
| | | | 345/8 |
| 7,543,943 B1 | 6/2009 | Hubby, Jr. | |
| 7,604,348 B2 | 10/2009 | Jacobs et al. | |
| 7,839,574 B2 | 11/2010 | Okada et al. | |
| 7,997,737 B2 | 8/2011 | Itoh et al. | |
| 8,066,385 B2 | 11/2011 | Kobori et al. | |
| 8,711,172 B2 | 4/2014 | Bae et al. | |
| 8,801,189 B2 | 8/2014 | Mizushima et al. | |
| 8,879,143 B2 | 11/2014 | Okagaki et al. | |
| 9,503,800 B2 | 11/2016 | Song et al. | |
| 9,529,194 B2 * | 12/2016 | Yoo | G02B 27/0101 |
| 9,696,553 B2 * | 7/2017 | Lyons | G02B 27/0172 |
| 10,078,988 B2 | 9/2018 | Kim et al. | |
| 10,215,979 B2 | 2/2019 | Irzyk | |
| 10,261,579 B2 * | 4/2019 | Wang | G09G 5/003 |
| 2002/0005829 A1 * | 1/2002 | Ouchi | H04N 9/3114 |
| | | | 345/88 |
| 2006/0246233 A1 | 11/2006 | Fukuda | |
| 2008/0291120 A1 * | 11/2008 | Wu | G02B 7/002 |
| | | | 345/8 |
| 2010/0265163 A1 | 10/2010 | Legerton et al. | |
| 2014/0285429 A1 | 9/2014 | Simmons | |
| 2016/0209656 A1 * | 7/2016 | Urey | G02B 27/0093 |
| 2017/0199442 A1 * | 7/2017 | Kim | G02B 3/14 |
| 2017/0261656 A1 * | 9/2017 | Kim | G02B 1/04 |

FOREIGN PATENT DOCUMENTS

| | | |
|---|---|---|
| CN | 101087365 A | 12/2007 |
| CN | 101251648 A | 8/2008 |
| CN | 101393382 A | 3/2009 |
| CN | 101410752 A | 4/2009 |
| CN | 101446653 A | 6/2009 |
| CN | 101685615 A | 3/2010 |
| CN | 101738742 A | 6/2010 |
| CN | 102483565 A | 5/2012 |
| CN | 102652272 A | 8/2012 |
| CN | 104317054 A | 1/2015 |
| CN | 104570355 A | 4/2015 |
| CN | 104813201 A | 7/2015 |
| CN | 105093526 A | 11/2015 |
| CN | 105388614 A | 3/2016 |
| CN | 105405380 A | 3/2016 |
| EP | 1072934 A2 | 1/2001 |
| JP | 2013-98611 | 5/2013 |
| KR | 10-0262825 | 8/2000 |
| KR | 10-2004-0005031 | 1/2004 |
| KR | 10-2013-0134919 | 12/2013 |
| KR | 10-2014-0064523 | 5/2014 |
| KR | 10-2015-0057183 | 5/2015 |
| KR | 10-2015-0059085 | 5/2015 |
| KR | 10-1546962 | 8/2015 |
| WO | 2015/138266 A1 | 9/2015 |

* cited by examiner

HEAD-MOUNTED DEVICE AND DISPLAY DEVICE

CROSS-REFERENCE TO RELATED APPLICATION

This U.S. non-provisional patent application claims priority to and the benefit of Korean Patent Application No. 10-2016-0034810, filed on Mar. 23, 2016, the contents of which are hereby incorporated by reference in their entirety.

BACKGROUND

1. Field of Disclosure

The present disclosure relates to a head-mounted device and a display device.

2. Description of the Related Art

A head-mounted device is a device worn on a head of a user and includes a display panel unit or is coupled to the display panel unit. The head-mounted device is used to realize an augmented reality or a virtual reality. The head-mounted device used to realize the augmented reality provides a virtual graphic image through a semi-transparent display. In this case, the user simultaneously perceives the virtual graphic image and a real object. The head-mounted device used to realize the virtual reality provides the virtual graphic image to eyes of the user. The user experiences the virtual reality through virtual contents.

SUMMARY

The present disclosure provides a head-mounted device having improved display quality and a display device.

Embodiments of the inventive concept provide a head-mounted device including a case including a body and a cover covering the body, the case having a display panel accommodating space between the body and the cover, an optical system in the body and facing the cover, and a filter in the body, the filter being spaced apart from the optical system in a first direction corresponding to a thickness direction of the optical system and being configured to repeatedly moving in a direction.

The filter may perform a reciprocating movement in the first direction.

The filter may perform a reciprocating movement in a direction perpendicular to the first direction.

The filter may rotate with respect to an axis extending in the first direction.

The filter may perform a reciprocating movement in a clockwise direction and a counter-clockwise direction with respect to an axis extending in the first direction.

The filter may be contracted and expanded to allow a thickness in the first direction thereof to be changed.

The filter may repeatedly move at an operating frequency that is higher than a critical fusion frequency.

An operating frequency of the filter may be variable in accordance with a user's request.

The optical system may include a left-eye optical system and a right-eye optical system spaced apart from the left-eye optical system in a second direction crossing the first direction, and the filter may include a left-eye filter spaced apart from the left-eye optical system in the first direction and a right-eye filter spaced apart from the right-eye optical system in the first direction.

The head-mounted device may further include a display panel in the display panel accommodating space, the display panel being configured to display an image. The filter may be between the display panel and the optical system.

The head-mounted device may further include a display panel in the display panel accommodating space, the display panel being configured to display an image. The optical system may be between the display panel and the filter.

The filter may have a polygonal shape.

The filter may have a round shape.

Embodiments of the inventive concept provide a display device including a display panel and a filter spaced apart from the display panel in a first direction corresponding to a thickness direction of the display panel, the filter being configured to repeatedly move in a direction.

The filter may perform a reciprocating movement in the first direction.

The filter may perform a reciprocating movement in a direction perpendicular to the first direction.

The filter may rotate with respect to an axis extending in the first direction.

The filter may perform a reciprocating movement in a clockwise direction and a counter-clockwise direction with respect to an axis extending in the first direction.

The filter may be contracted and expanded to allow a thickness in the first direction thereof to be changed.

The filter may repeatedly move at an operating frequency higher than a critical fusion frequency.

According to the above-mentioned head-mounted device and the display device, the occurrence of the phenomenon in which the noise in the image is recognized by the user may be reduced.

BRIEF DESCRIPTION OF THE DRAWINGS

The above and other features of the present disclosure will become readily apparent by reference to the following detailed description when considered in conjunction with the accompanying drawings wherein.

DETAILED DESCRIPTION

Figure 1:
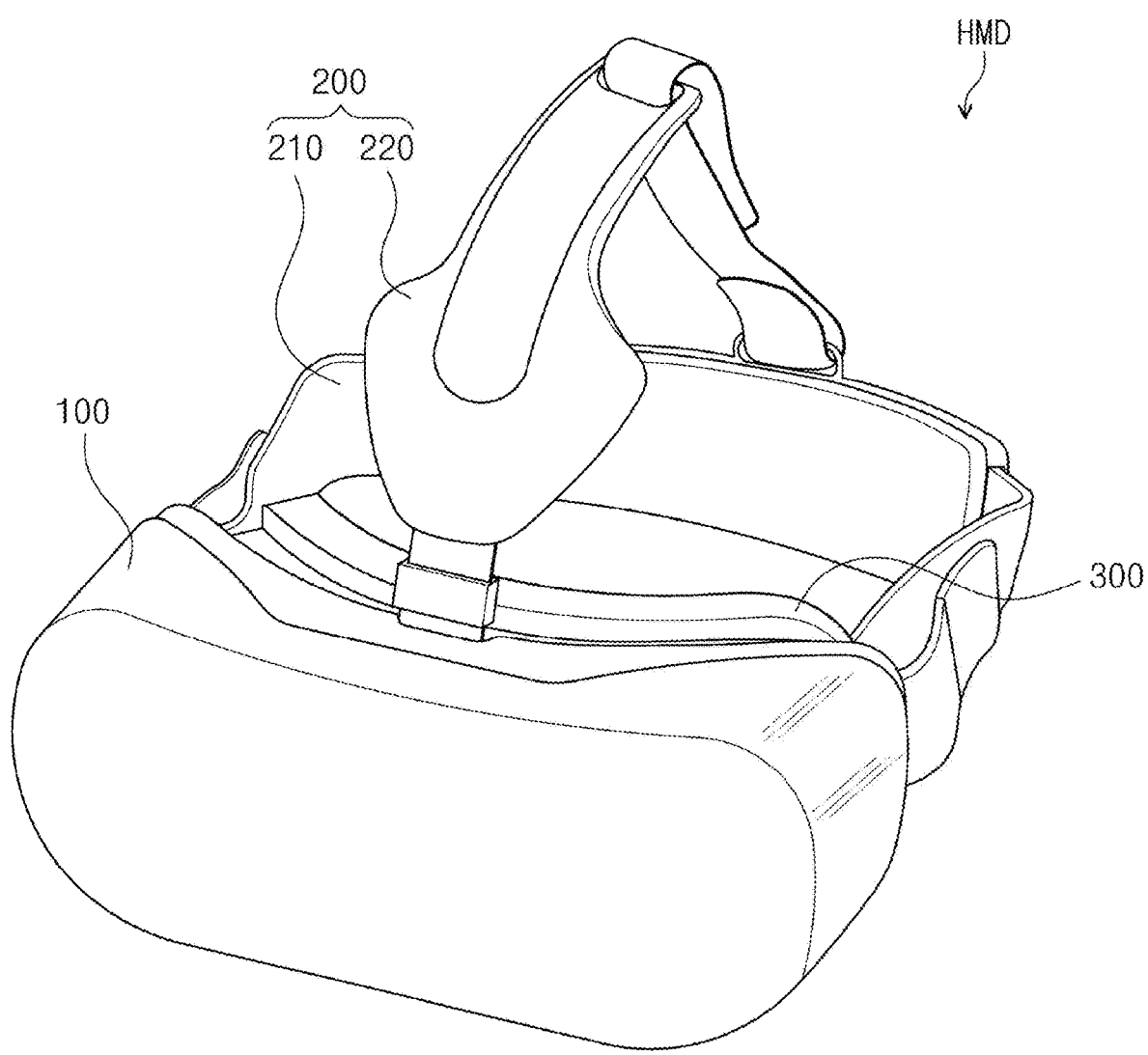
FIG. 1 is a perspective view showing a head-mounted device according to an exemplary embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

It will be understood that, although the terms "first," "second," "third," etc., may be used herein to describe various elements, components, regions, layers, and/or sections, these elements, components, regions, layers, and/or sections should not be limited by these terms. These terms are used to distinguish one element, component, region, layer, or section from another element, component, region, layer, or section. Thus, a first element, component, region, layer, or section discussed below could be termed a second element, component, region, layer, or section without departing from the spirit and scope of the present invention.

A relevant device or component (or relevant devices or components) according to embodiments of the present invention described herein may be implemented utilizing any suitable hardware (e.g., an application-specific integrated circuit), firmware (e.g., a DSP or FPGA), software, or a suitable combination of software, firmware, and hardware. For example, the various components of the relevant device(s) may be formed on one integrated circuit (IC) chip or on separate IC chips. Further, the various components of the relevant device(s) may be implemented on a flexible printed circuit film, a tape carrier package (TCP), a printed circuit board (PCB), or formed on a same substrate as one or more circuits and/or other devices. Further, the various components of the relevant device(s) may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the exemplary embodiments of the present invention.

Spatially relative terms, such as "top," "bottom," "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below," "beneath," or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

Further, it will also be understood that when one element, component, region, layer, and/or section is referred to as being "between" two elements, components, regions, layers, and/or sections, it can be the only element, component, region, layer, and/or section between the two elements, components, regions, layers, and/or sections, or one or more intervening elements, components, regions, layers, and/or sections may also be present.

The terminology used herein is for the purpose of describing particular embodiments and is not intended to be limiting of the present invention. As used herein, the singular forms "a" and "an" are intended to include the plural forms as well, unless the context clearly indicates otherwise. It will be further understood that the terms "comprise," "comprises," "comprising," "includes," "including," and "include," when used in this specification, specify the presence of stated features, integers, steps, operations, elements, and/or components, but do not preclude the presence or addition of one or more other features, integers, steps, operations, elements, components, and/or groups thereof.

As used herein, the term "and/or" includes any and all combinations of one or more of the associated listed items. Expressions such as "at least one of," "one of," and "selected from," when preceding a list of elements, modify the entire list of elements and do not modify the individual elements of the list. Further, the use of "may" when describing embodiments of the present invention refers to "one or more embodiments of the present invention." Also, the term "exemplary" is intended to refer to an example or illustration.

It will be understood that when an element or layer is referred to as being "on," "connected to," "coupled to," "connected with," "coupled with," or "adjacent to" another element or layer, it can be "directly on," "directly connected to," "directly coupled to," "directly connected with," "directly coupled with," or "directly adjacent to" the other element or layer, or one or more intervening elements or layers may be present. Furthermore, "connection," "connected," etc., may also refer to "electrical connection," "electrically connected," etc., depending on the context in which such terms are used as would be understood by those skilled in the art. When an element or layer is referred to as being "directly on," "directly connected to," "directly coupled to," "directly connected with," "directly coupled with," or "immediately adjacent to" another element or layer, there are no intervening elements or layers present.

As used herein, "substantially," "about," and similar terms are used as terms of approximation and not as terms of degree, and are intended to account for the inherent deviations in measured or calculated values that would be recognized by those of ordinary skill in the art.

As used herein, the terms "use," "using," and "used" may be considered synonymous with the terms "utilize," "utilizing," and "utilized," respectively.

Features described in relation to one or more embodiments of the present invention are available for use in conjunction with features of other embodiments of the present invention. For example, features described in a first embodiment may be combined with features described in a second embodiment to form a third embodiment, even though the third embodiment may not be specifically described herein.

Hereinafter, the embodiments of the present invention will be explained in detail with reference to the accompanying drawings.

Figure 2:
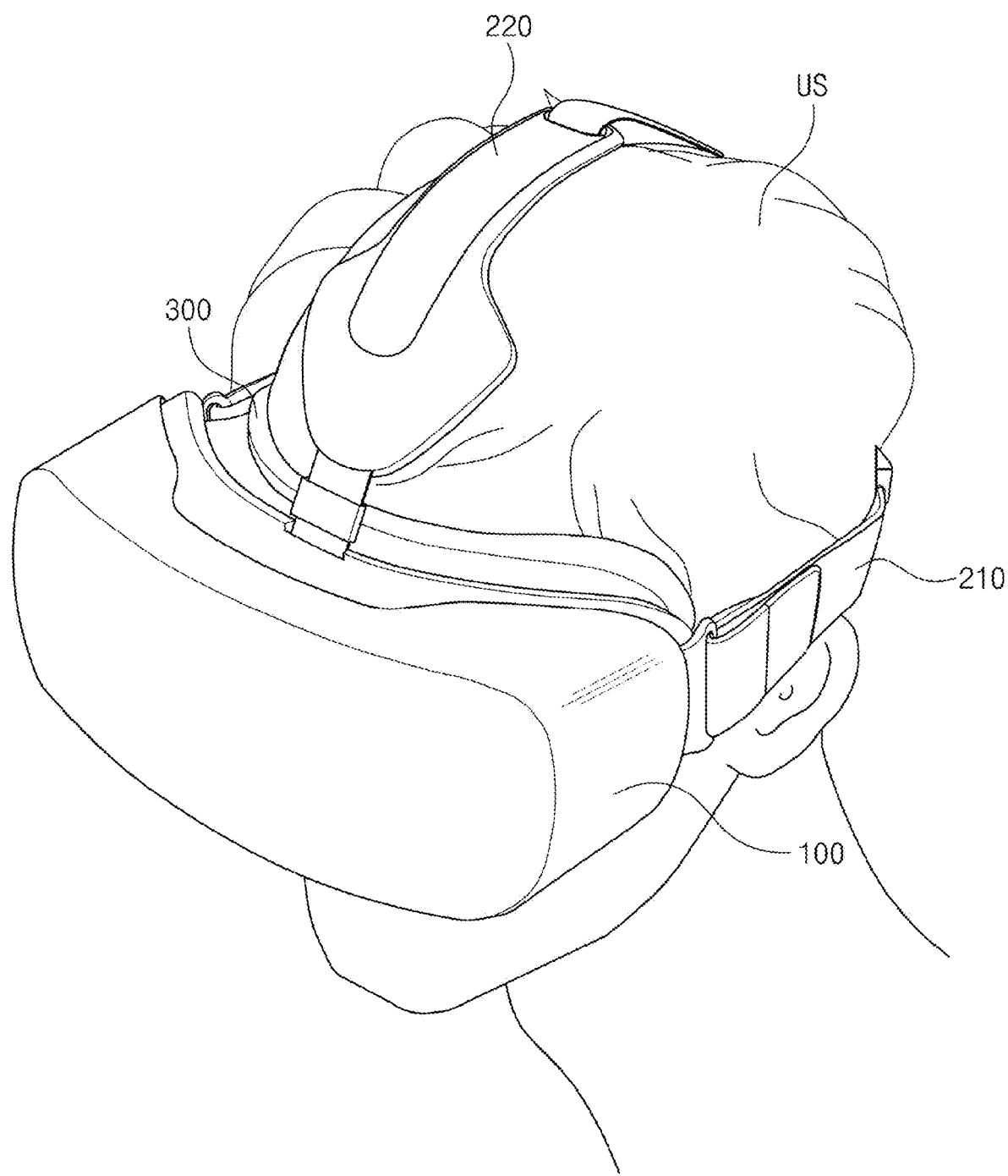
FIG. 2 is a perspective view showing a head-mounted device worn on a head of a user according to an exemplary embodiment of the present disclosure.

FIG. 1 is a perspective view showing a head-mounted device HMD according to an exemplary embodiment of the present disclosure, and FIG. 2 is a perspective view showing the head-mounted device HMD worn on a head of a user according to an exemplary embodiment of the present disclosure.

Referring to FIGS. 1 and 2, the head-mounted device HMD is worn on a head of a user US. The head-mounted device HMD may provide the user US with an image while a real peripheral vision of the user is blocked. The user US wearing the head-mounted device HMD may be easily immersed in virtual reality.

The head-mounted device HMD includes a case part 100 (e.g., a case 100), a strap part 200 (e.g., a strap 200), and a cushion part 300 (e.g., a cushion 300).

The case part 100 is mounted on the user US. The case part 100 accommodates a display panel unit (e.g., a display panel) for displaying the image and accommodates an acceleration sensor therein. The acceleration sensor senses a movement of the user US and applies a signal (e.g., a predetermined signal) to the display panel unit. Accordingly, the display panel unit displays an image corresponding to a change in the user's eye movement. Therefore, the user US may experience the virtual reality as if it is real.

The case part 100 may accommodate components with various suitable functions in addition to the above-mentioned components. For example, the case part 100 may accommodate a proximity sensor to check whether the user US wears the head-mounted display device HMD. In addition, an operation part may be additionally disposed on an outer portion of the case part 100 to control a volume or a brightness of screen. The operation part may be a physical button or a touch sensor.

The strap part 200 is coupled to the case part 100 to allow the user US to easily wear the case part 100. The strap part 200 includes a main strap 210 and an upper strap 220.

The main strap 210 is worn around the head of the user US. The main strap 210 fixes the case part 100 to the user US such that the case part 100 is adhered to the head of the user US. The upper strap 220 connects the case part 100 and the main strap 210 along an upper portion of the head of the user US. The upper strap 220 prevents the case part 100 from slipping down. In addition, the upper strap 220 distributes a weight of the case part 100 to improve feeling of wearing the head-mounted display device HMD on the head of the user US.

The main strap 210 and the upper strap 220 shown in FIG. 1 have a length that is adjustable using a separate length control part, but it should not be limited thereto or thereby.

That is, according to another embodiment, when the main strap 210 and the upper strap 220 have elasticity, the length control part may be omitted.

The case part 100 may be fixed to the user US. The strap part 200 may have a variety of shapes in addition to the shape shown in FIGS. 1 and 2. For example, the upper strap 220 may be omitted according to another embodiment. In addition, the strap part 200 may be provided in a helmet coupled to the case part 100 or temples of glasses coupled to the case part 100.

The cushion part 300 is disposed between the case part 100 and the head of the user US. The cushion part 300 may include a material that may be deformed. For example, the cushion part 300 may include a polymer resin, e.g., polyurethane, polycarbonate, polypropylene, polyethylene, etc., or a sponge formed by foam-molding a rubber solution, a urethane-based material, and/or an acrylic-based material.

The cushion part 300 may allow the case part 100 to be adhered to the user US, and thus the feeling of wearing the head-mounted display device HMD on the user may be improved with respect to the head-mounted display device HMD. The cushion part 300 may be detachable from and attachable to the case part 100. The cushion part 300 may be omitted according to another embodiment.

Figure 3:
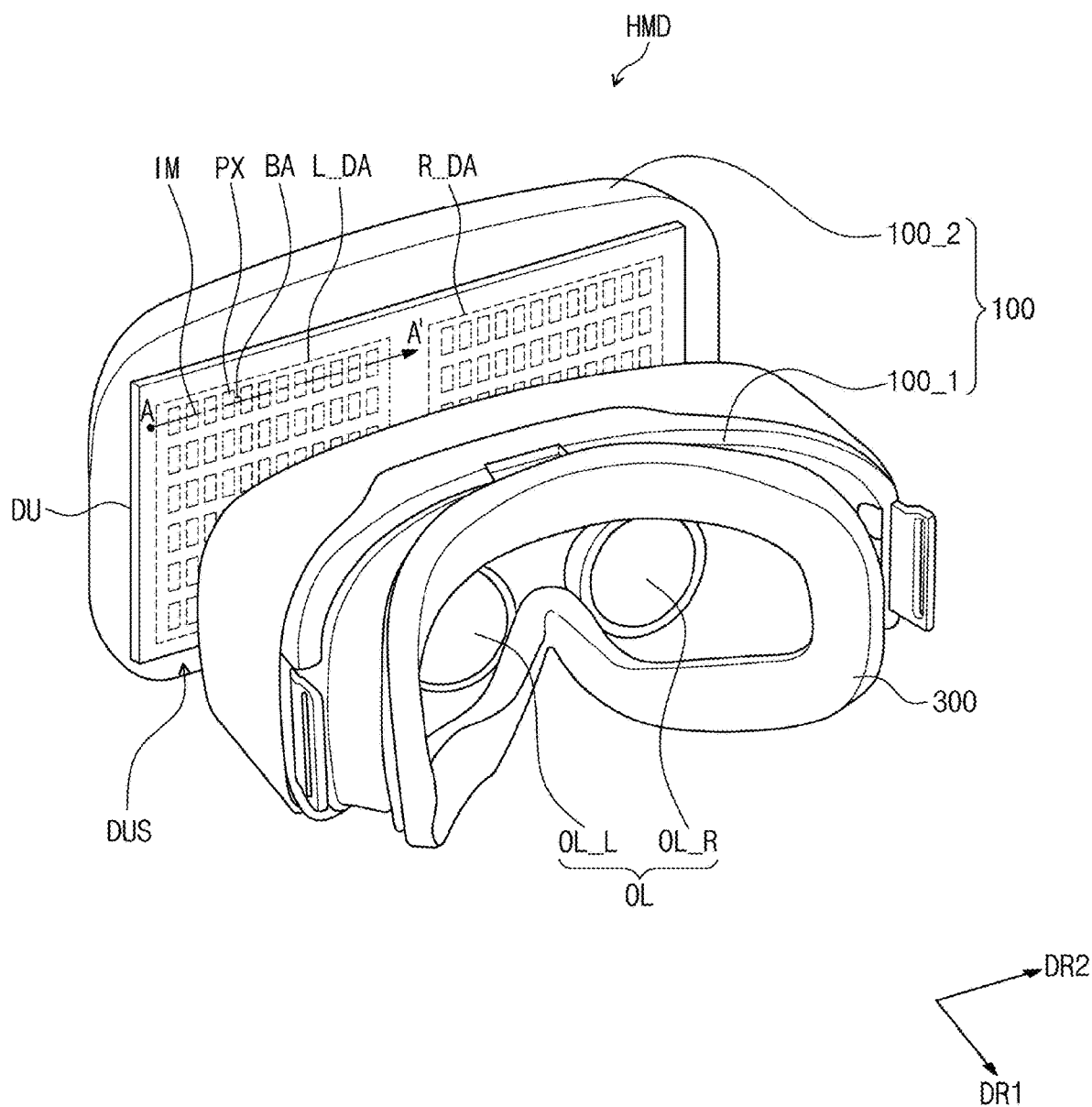
FIG. 3 is an exploded perspective view showing a head-mounted device according to an exemplary embodiment of the present disclosure.
Figure 4:
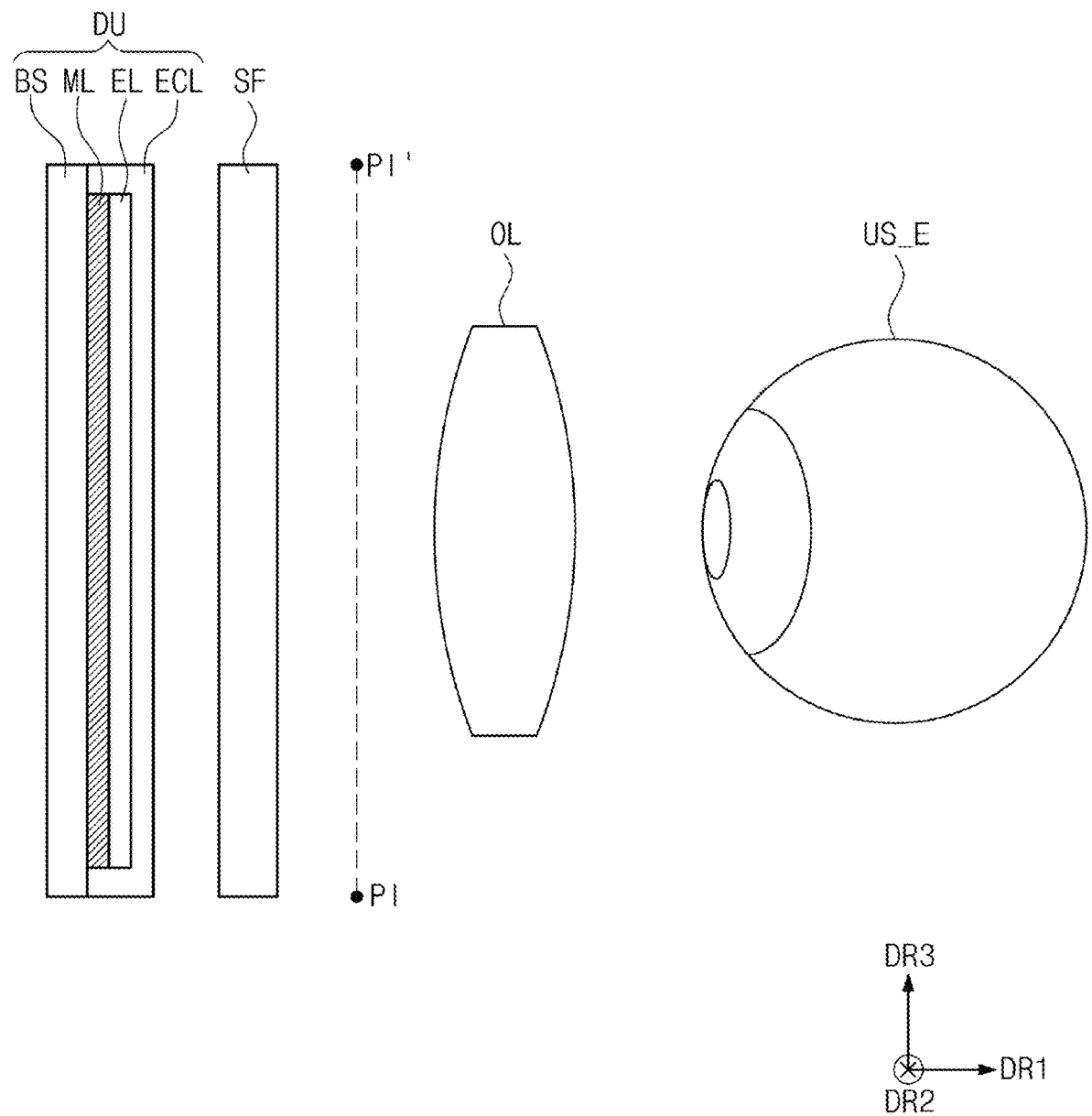
FIG. 4 is a cross-sectional view showing a head-mounted device according to an exemplary embodiment of the present disclosure.

FIG. 3 is an exploded perspective view showing a head-mounted device according to an exemplary embodiment of the present disclosure, and FIG. 4 is a cross-sectional view showing a head-mounted device according to an exemplary embodiment of the present disclosure. FIG. 4 shows a display panel unit DU, a filter SF, an optical system OL, and an eye of the user US_E. While only one eye is shown in FIG. 4, embodiments of the present invention may be applied to both eyes of the user US.

Referring to FIGS. 3 and 4, the case part 100 includes a body portion 100_1 (e.g., a body 100_1) and a cover portion 100_2 (e.g., a cover 100_2), which are separated from each other. An accommodating space is provided between the body portion 100_1 and the cover portion 100_2 to accommodate the display panel unit, and the cover portion 100_2 covers the display panel unit accommodating space DUS. FIG. 3 shows the body portion 100_1 and the cover portion 100_2 separated from the body portion 100_1, but they should not be limited thereto or thereby. For example, the body portion 100_1 and the cover portion 100_2 may be integrally formed with each other and may not be separated from each other.

The display panel unit DU may be accommodated in the display panel unit accommodating space DUS defined between the body portion 100_1 and the cover portion 100_2. The display panel unit DU may be built in the head-mounted device HMD and provide the image, but it should not be limited thereto or thereby. For example, a display device (e.g., a mobile terminal) including the display panel unit DU may be coupled to the head-mounted device HMD to provide the image.

In FIG. 3, a left-eye image and a right-eye image are displayed through one display panel unit DU (e.g., one display panel DU). The display panel unit DU includes a left-eye image display area L_DA through which the left-eye image is displayed and a right-eye image display area R_DA through which the right-eye image is displayed. The left-eye image display area L_DA and the right-eye image display area R_DA are driven by separate drivers, respectively, but they should not be limited thereto or thereby. That is, the left-eye image display area L_DA and the right-eye image display area R_DA may be driven by one driver. In addition, according to another embodiment, the display panel unit DU may include a left-eye display panel unit and a right-eye display panel unit, which are separated from each other.

The display panel unit DU generates an image corresponding to image data input thereto. The display panel unit DU may be, but is not limited to, an organic light emitting display panel, a liquid crystal display panel, a plasma display panel, an electrophoretic display panel, or an electrowetting display panel. In the present exemplary embodiment, the display panel unit DU includes the organic light emitting display panel, but it should not be limited to thereto or thereby.

The display panel unit DU may include a base substrate BS, a circuit layer ML, an organic light emitting element layer EL, and an encapsulation layer ECL.

The base substrate BS includes at least one of a glass substrate, a sapphire substrate, and a plastic substrate. The circuit layer ML, the organic light emitting element layer EL, and the encapsulation layer ECL are disposed on the base substrate BS.

The circuit layer ML may include a plurality of signal lines and electronic devices. For example, the circuit layer ML may include gate lines, data lines, and thin film transistors respectively corresponding to pixels.

The organic light emitting element layer EL may include an organic light emitting layer containing a low molecular weight or high molecular weight organic material. The organic light emitting layer may emit light. The organic light emitting element layer EL may selectively include a hole transport layer (HTL), a hole injection layer (HIL), an electron transport layer (ETL), and an electron injection layer (EIL) in addition to the organic light emitting layer.

The encapsulation layer ECL may include a thin film encapsulation layer (TFE) configured to include a plurality of inorganic thin film layers and a plurality of organic thin film layers. The encapsulation layer ECL covers the organic light emitting element layer EL and blocks air and moisture to protect the organic light emitting element layer EL. In the present exemplary embodiment, the encapsulation layer ECL may be replaced with an encapsulation substrate. The encapsulation substrate may be disposed spaced apart from the base substrate BS such that the organic light emitting element layer EL is disposed between the encapsulation substrate and the base substrate BS. The encapsulation substrate and the base substrate BS are coupled to each other by a sealant arranged along an edge of the base substrate BS.

A filter SF is disposed spaced apart from the display panel unit DU in a first direction DR1 corresponding to a thickness direction of the display panel unit DU. A thickness direction of the optical system OL may be substantially parallel to the first direction DR1.

The filter SF may scatter, diffract, or refract the image provided from the display panel unit DU. The filter SF may be a light scattering filter, a light diffraction filter, a light refraction filter, or an optical filter including a microlens array; however, it should not be limited thereto or thereby. Various suitable filters may be used as the filter SF except for the above-mentioned filters. In addition, the filter SF may include a plurality of optical filters each having a different function from each other.

The filter SF may serve as a spatial frequency filter. In more detail, the filter SF may serve as a low-pass filter that passes an image having a spatial frequency in a low frequency component. In more detail, a non-pixel area BA in which no image is displayed may be defined between the pixels PX. The pixels PX are disposed spaced apart from each other such that the non-pixel area BA is disposed between the pixels PX. When a spatial frequency of the pixels PX and the non-pixel area BA is referred to as a first spatial frequency, a spatial frequency of the image displayed through the display panel unit DU may be lower than the first spatial frequency. Accordingly, the image displayed through the display panel unit DU passes through the filter SF, and a contrast ratio between the pixels PX and the non-pixel area BA is lowered. As a result, a boundary between the pixels PX and the non-pixel area BA may not be perceived by the user.

In FIG. 3, the pixels PX have a rectangular shape and are arranged in a matrix form, but they should not be limited thereto or thereby. That is, the pixels PX may have a variety of shapes, e.g., a polygonal shape, a circular shape, an oval shape, etc. In addition, the pixels PX may be arranged in other various suitable forms.

In addition, the filter SF may repeatedly move along a direction (e.g., a predetermined direction). In this case, although the filter SF has irregular characteristics, a stain may not be recognized. Accordingly, according to the present exemplary embodiment, a phenomenon in which the non-pixel area BA is recognized may be reduced due to the filter SF, and the phenomenon in which the non-pixel area BA is recognized may be reduced due to the repetitive movement of the filter SF. The filter SF may straightly and repeatedly move or circularly and repeatedly move along various suitable directions. The repetitive movement of the filter SF will be described in detail later.

The optical system OL is disposed inside the body portion 100_1 of the case part 100. The optical system OL magnifies the image provided from the display panel unit DU. The image provided from the display panel unit DU may be scattered, diffracted, or refracted while passing through the filter SF, and the optical system OL may magnify the image passing through the filter SF.

The optical system OL is disposed spaced apart from the display panel unit DU in the first direction DR1. The optical system OL is disposed between the display panel unit DU and an eye US_E of the user US (refer to FIG. 2).

Figure 7:
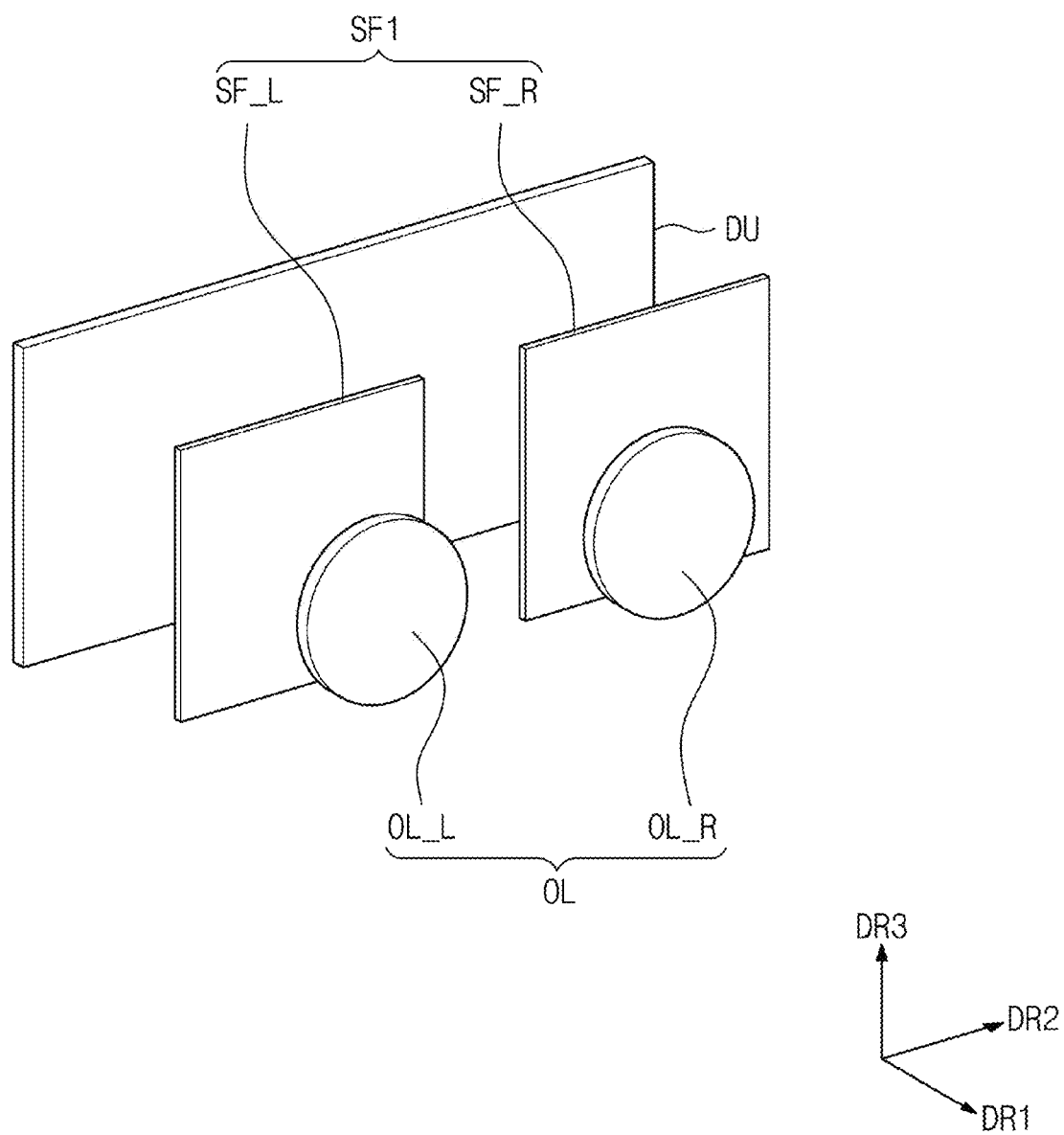
FIG. 7 is a perspective view showing a portion of a head-mounted device according to an exemplary embodiment of the present disclosure.

The optical system OL may include a right-eye optical system OL_R and a left-eye optical system OL_L (e.g., see FIG. 7). The left-eye optical system OL_L may provide the image to a left pupil of the user US (refer to FIG. 2) after magnifying the image, and the right-eye optical system OL_R may provide the image to a right pupil of the user US (refer to FIG. 2) after magnifying the image.

The left-eye optical system OL_L and the right-eye optical system OL_R are disposed spaced apart from each other in a second direction DR2 crossing the first direction DR1. A distance between the left-eye optical system OL_L and the right-eye optical system OL_R may be controlled to correspond to a distance between two eyes US_E of the user US (refer to FIG. 2). In addition, a distance between the optical system OL and the display panel unit DU may be controlled in accordance with eyesight of the user US (refer to FIG. 2).

The optical system OL may be a convex aspherical lens. In the present exemplary embodiment, each of the left-eye optical system OL_L and the right-eye optical system OL_R includes only one lens, but the number of the lenses of each of the left-eye optical system OL_L and the right-eye optical system OL_R should not be limited to one. For example, each of the left-eye optical system OL_L and the right-eye optical system OL_R may include a plurality of lenses.

Figure 5:
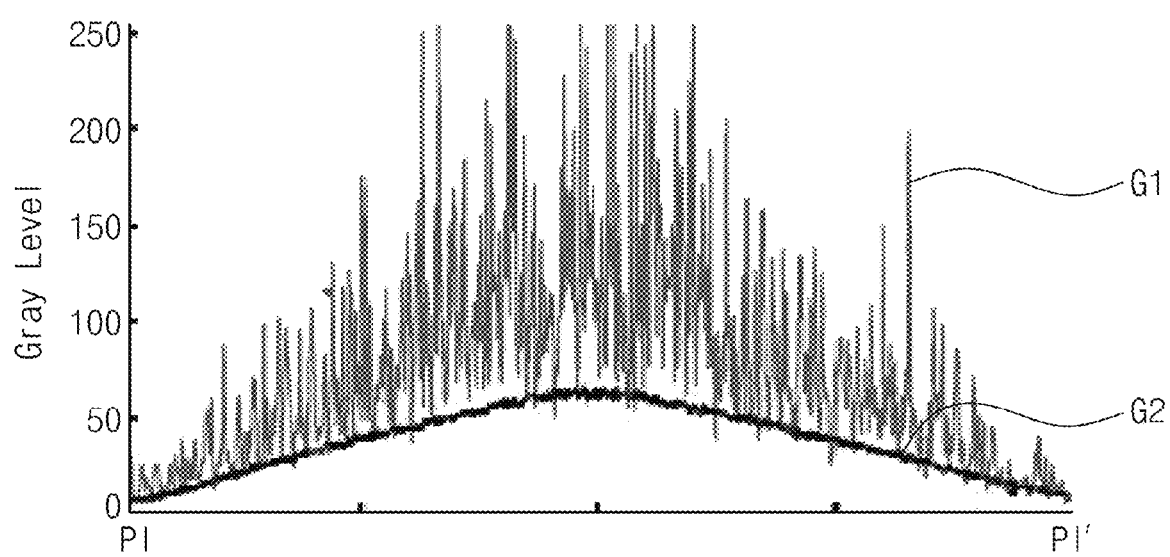
FIG. 5 is a graph showing a variation in gray level measured along the line PI-PI' of FIG. 4.

FIG. 5 is a graph showing a variation in gray level measured along the line PI-PI' of FIG. 4.

FIG. 5 is a graph showing the variation in gray level measured when the display panel unit DU is viewed from a direction opposite to the first direction DR1 along an imaginary line connected between an imaginary point PI and another imaginary point PI'.

Referring to FIGS. 4 and 5, a first graph G1 shows the variation in gray level measured when the filter SF does not repeatedly move along a direction (e.g., the predetermined direction), and a second graph G2 shows the variation in gray level measured when the filter SF repeatedly moves along a direction (e.g., the predetermined direction).

As represented by the first graph G1, the measured gray level has a variety of values ranging from 0 to 250 levels due to the irregular characteristics of the filter SF. That is, in the case that the filter SF is disposed in front of the display panel unit DU, the contrast ratio between the pixels PX (refer to FIG. 3) and the non-pixel area BA (refer to FIG. 3) is lowered, and thus the boundary between the pixels PX (refer to FIG. 3) and the non-pixel area BA (refer to FIG. 3) is not recognized as described above, but the stain may be recognized due to the irregular characteristics of the filter SF.

However, as represented by the second graph G2 according to the present exemplary embodiment, because the filter SF repeatedly moves, a spatial noise caused by the difference in gray level may be converted to a temporal noise. In this case, the filter SF may repeatedly move at a cycle lower than a suitable cycle (e.g., a predetermined cycle) such that the user does not recognize the temporal noise. For example, an operating frequency, which corresponds to a reciprocal of the cycle at which the filter SF repeatedly moves, may be higher than a critical fusion frequency (CFF). The CFF is a minimum frequency that allows the user not to recognize blinking when two different lights are alternately blinked because the user feels that the light is always on (i.e., it appears to the user as if the light is always on). Accordingly, the temporal noise may not be recognized by the user, and as a result, the phenomenon in which the stain is recognized by the user may be reduced.

Figure 6:
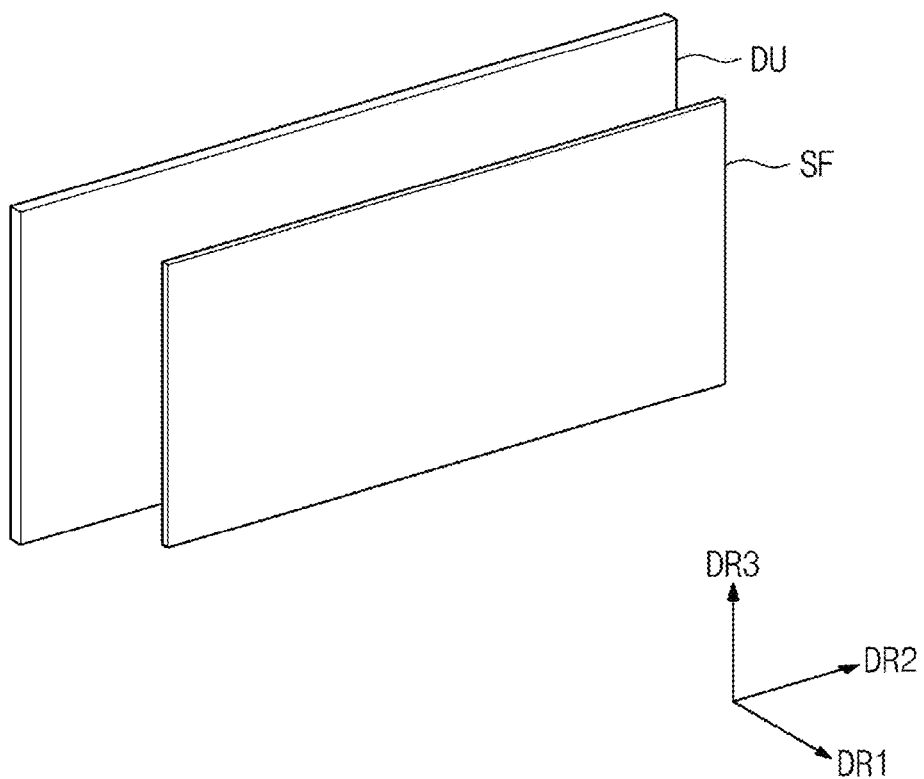
FIG. 6 is a perspective view showing a portion of a head-mounted device according to an exemplary embodiment of the present disclosure.

FIG. 6 is a perspective view showing a portion of a head-mounted device according to an exemplary embodiment of the present disclosure. FIG. 6 shows the display panel unit DU and the filter SF.

Referring to FIG. 6, the filter SF is disposed spaced apart from the display panel unit DU in the first direction DR1. The filter SF may perform a reciprocating movement in the first direction DR1 or the second direction DR2 crossing the first direction DR1.

The filter SF may repeatedly move back and forth in a direction away from the display panel unit DU and a direction close to the display panel unit DU along the first direction DR1. That is, the filter SF may perform the reciprocating movement in the first direction DR1. In this case, a distance between the filter SF and the display panel unit DU is continuously varied.

A frequency indicating the number of times that the filter SF moves to the first direction DR1 from a reference position and moves to a direction opposite to the first direction DR1 to return to the reference position again during 1 second may be higher than the CFF, but it should not be limited thereto or thereby. That is, the frequency may be arbitrarily adjusted by the user US (refer to FIG. 2). For example, when assuming that a default frequency is about 60 Hz, the user US (refer to FIG. 2) may increase the number of the repetitive movements of the filter SF during about 1 seconds such that the frequency becomes higher than the default frequency or may decrease the number of the repetitive movements of the filter SF during about 1 seconds such that the frequency becomes lower than the default frequency.

The filter SF may repeatedly move in the second direction DR2 crossing the first direction DR1. In this case, the distance between the filter SF and the display panel unit DU may be constantly maintained without being changed. The filter SF may perform the reciprocating movement in various suitable directions while constantly maintaining the distance between the filter SF and the display panel unit DU. For example, the filter SF may perform the reciprocating movement on a plane defined by the second direction DR2 and the third direction DR3. The third direction DR3 may cross the first direction DR1 and the second direction DR2.

The filter SF may have a polygonal shape when viewed in the first direction DR1. FIG. 6 shows the filter SF having a rectangular shape, but the filter SF may have various suitable shapes, e.g., a square shape, a lozenge shape, a pentagonal shape, a hexagonal shape, etc.

FIG. 7 is a perspective view showing a portion of a head-mounted device according to an exemplary embodiment of the present disclosure. FIG. 7 shows a display panel unit DU and a filter SF1.

Referring to FIG. 7, the filter SF1 may include a left-eye filter SF_L and a right-eye filter SF_R. The left-eye filter SF_L and the right-eye filter SF_R may be spaced apart from each other in the second direction DR2. The left-eye filter SF_L may be disposed between the display panel unit DU and a left-eye optical system OL_L, and the right-eye filter SF_R may be disposed between the display panel unit DU and a right-eye optical system OL_R. The left-eye optical system OL_L may be disposed spaced apart from the left-eye filter SF_L in the first direction DR1, and the right-eye optical system OL_R may be disposed spaced apart from the right-eye filter SF_R in the first direction DR1.

Each of the left-eye filter SF_L and the right-eye filter SF_R may repeatedly move in a direction (e.g., a predetermined direction). For example, each of the left-eye filter SF_L and the right-eye filter SF_R may perform the reciprocating movement in the first direction DR1 or may perform the reciprocating movement on a plane defined by the second and third directions DR2 and DR3 as described with reference to FIG. 6. The left-eye filter SF_L and the right-eye filter SF_R may repeatedly move in the same direction, substantially the same direction, or in different directions.

Each of the left-eye filter SF_L and the right-eye filter SF_R may have a polygonal shape when viewed in the first direction DR1. In FIG. 7, each of the left-eye filter SF_L and the right-eye filter SF_R has a rectangular shape, but each of the left-eye filter SF_L and the right-eye filter SF_R may have various suitable shapes, e.g., a square shape, a lozenge shape, a pentagonal shape, a hexagonal shape, etc.

Figure 8:
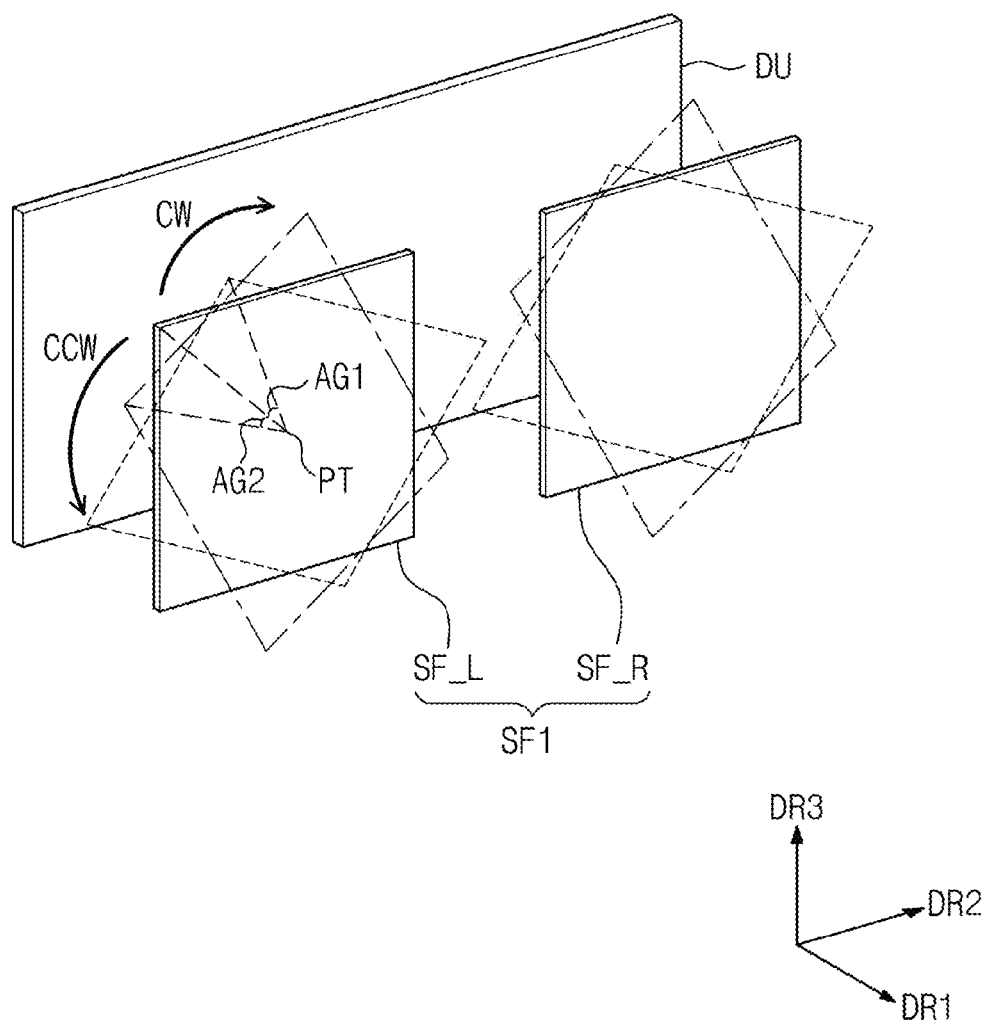
FIG. 8 is a perspective view showing a portion of a head-mounted device according to an exemplary embodiment of the present disclosure.

FIG. 8 is a perspective view showing a portion of a head-mounted device according to an exemplary embodiment of the present disclosure. FIG. 8 shows a display panel unit DU and a filter SF1.

Referring to FIG. 8, the filter SF1 includes a left-eye filter SF_L and a right-eye filter SF_R. Each of the left-eye filter SF_L and the right-eye filter SF_R may perform a reciprocating cyclic movement, in which each of the left-eye filter SF_L and the right-eye filter SF_R rotates by an angle (e.g., a predetermined angle) with respect to a corresponding point (e.g., a corresponding predetermined point) thereof. In the present exemplary embodiment, the left-eye filter SF_L will be described in detail as a representative example after assigning reference numerals to the left-eye filter SF_L. The right-eye filter SF_R may move the same or substantially the same as the left-eye filter SF_L.

A fixed point PT corresponding to a center of rotation is defined on the left-eye filter SF_L. In FIG. 8, the fixed point PT is defined at a center of the left-eye filter SF_L, but the position of the fixed point PT should not be limited to the center of the left-eye filter SF_L. For example, the fixed point PT may be defined at various suitable positions. The fixed point PT may be any position on the left-eye filter SF_L overlapped with an axis extending in the first direction DR1.

The left-eye filter SF_L may rotate in a clockwise direction CW by a first angle AG1 and in a counter-clockwise direction CCW by a second angle AG2 with respect to the fixed point PT. For example, the left-eye filter SF_L may perform the reciprocating cyclic movement, in which the left-eye filter SF_L rotates in the clockwise direction CW by the first angle AG1, rotates in the counter-clockwise direction CCW by an angle corresponding to a sum of the first angle AG1 and the second angle AG2, and rotates in the clockwise direction CW by the angle corresponding to the sum of the first angle AG1 and the second angle AG2 with respect to the fixed point PT.

The first angle AG1 may be the same as, substantially the same as, or different from the second angle AG2. The first angle AG1 and the second angle AG2 may be adjusted depending on the inner space of the case part 100 (refer to FIG. 3).

Figure 9:
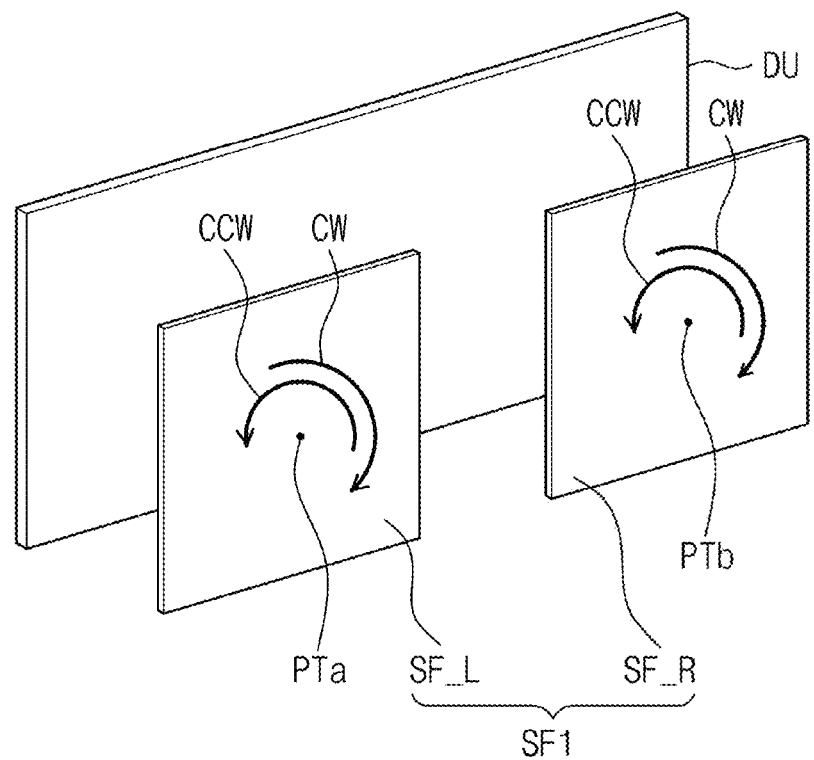
FIG. 9 is a perspective view showing a portion of a head-mounted device according to an exemplary embodiment of the present disclosure.

FIG. 9 is a perspective view showing a portion of a head-mounted device according to an exemplary embodiment of the present disclosure. FIG. 9 shows a display panel unit DU and a filter SF1.

Referring to FIG. 9, the filter SF1 includes a left-eye filter SF_L and a right-eye filter SF_R. Each of the left-eye filter SF_L and the right-eye filter SF_R may rotate with respect to a corresponding point (e.g., a corresponding predetermined point) thereof. The left-eye filter SF_L may rotate in a clockwise direction CW or a counter-clockwise direction CCW with respect to a center point PTa defined in the left-eye filter SF_L. The right-eye filter SF_R may rotate in the clockwise direction CW or the counter-clockwise direction CCW with respect to a center point PTb defined in the right-eye filter SF_R. Each of the center points PTa and PTb may be any point on the left-eye filter SF_L and the right-eye filter SF_R, which is overlapped with an axis extending in the first direction DR1.

The left-eye filter SF_L and the right-eye filter SF_R may rotate in the same direction, substantially the same direction, or different directions. In addition, each of the left-eye filter SF_L and the right-eye filter SF_R may continuously rotate in one direction of the clockwise direction CW and the counter-clockwise direction CCW, and the rotation direction of each of the left-eye filter SF_L and the right-eye filter SF_R may change (e.g., reverse) after a period of time lapses (e.g. a predetermined time lapses).

Figure 10:
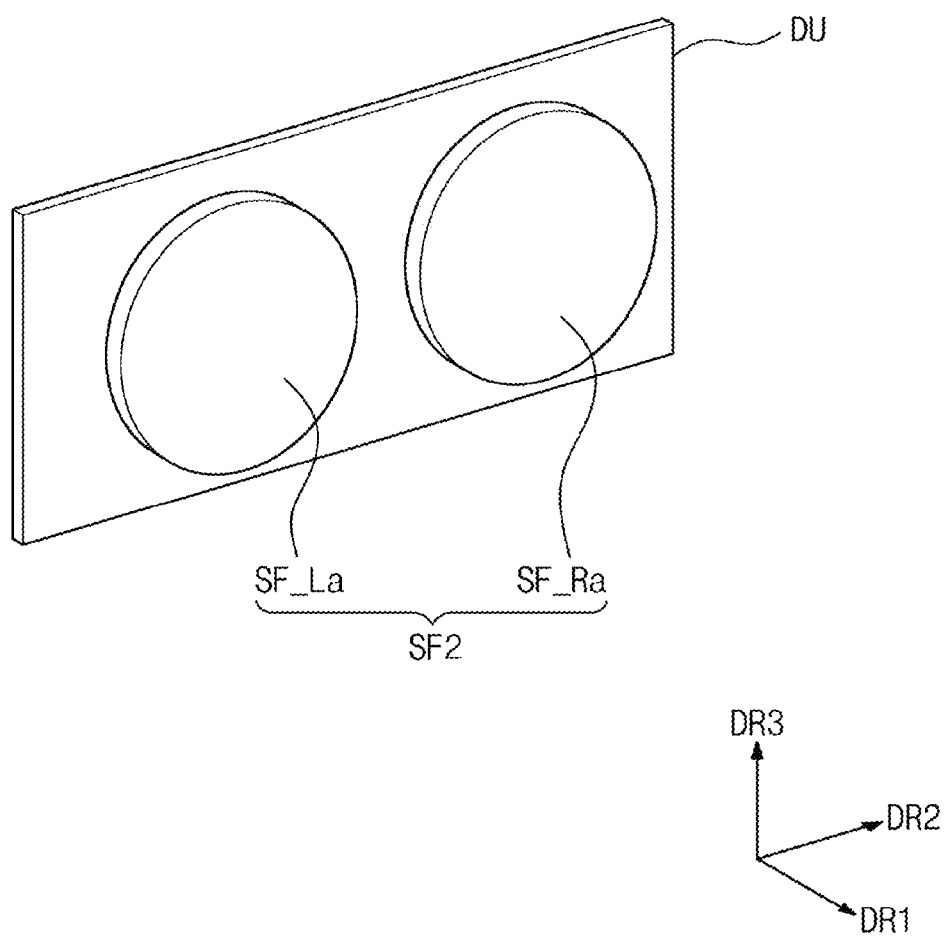
FIG. 10 is a perspective view showing a portion of a head-mounted device according to an exemplary embodiment of the present disclosure.

FIG. 10 is a perspective view showing a portion of a head-mounted device according to an exemplary embodiment of the present disclosure. FIG. 10 shows a display panel unit DU and a filter SF2.

Referring to FIG. 10, the filter SF2 includes a left-eye filter SF_La and a right-eye filter SF_Ra. Each of the left-eye filter SF_La and the right-eye filter SF_Ra has a round shape. In FIG. 10, each of the left-eye filter SF_La and the right-eye filter SF_Ra has a circular shape, but the shape of each of the left-eye filter SF_La and the right-eye filter SF_Ra should not be limited thereto or thereby. For example, each of the left-eye filter SF_La and the right-eye filter SF_Ra may have an oval shape. According to another embodiment, each of the left-eye filter SF_La and the right-eye filter SF_Ra may have a fan shape.

The left-eye filter SF_La and the right-eye filter SF_Ra may perform the reciprocating movement in a direction away from the display panel unit DU and a direction towards the display panel unit DU along the first direction DR1. In addition, different from this, the left-eye filter SF_La and the right-eye filter SF_Ra may perform the reciprocating movement in a straight line along a direction (e.g., a predetermined direction) on a plane defined by the second and third directions DR2 and DR3. For example, the left-eye filter SF_La and the right-eye filter SF_Ra may perform the reciprocating movement in the second direction DR2 and a direction opposite to the second direction DR2. In addition, each of the left-eye filter SF_La and the right-eye filter SF_Ra may rotate with respect to an axis extending in the first direction DR1, or may perform the reciprocating cyclic movement in which each of the left-eye filter SF_La and the right-eye filter SF_Ra rotates in a clockwise direction and a counter-clockwise direction with respect to the axis extending in the first direction DR1.

Figure 11:
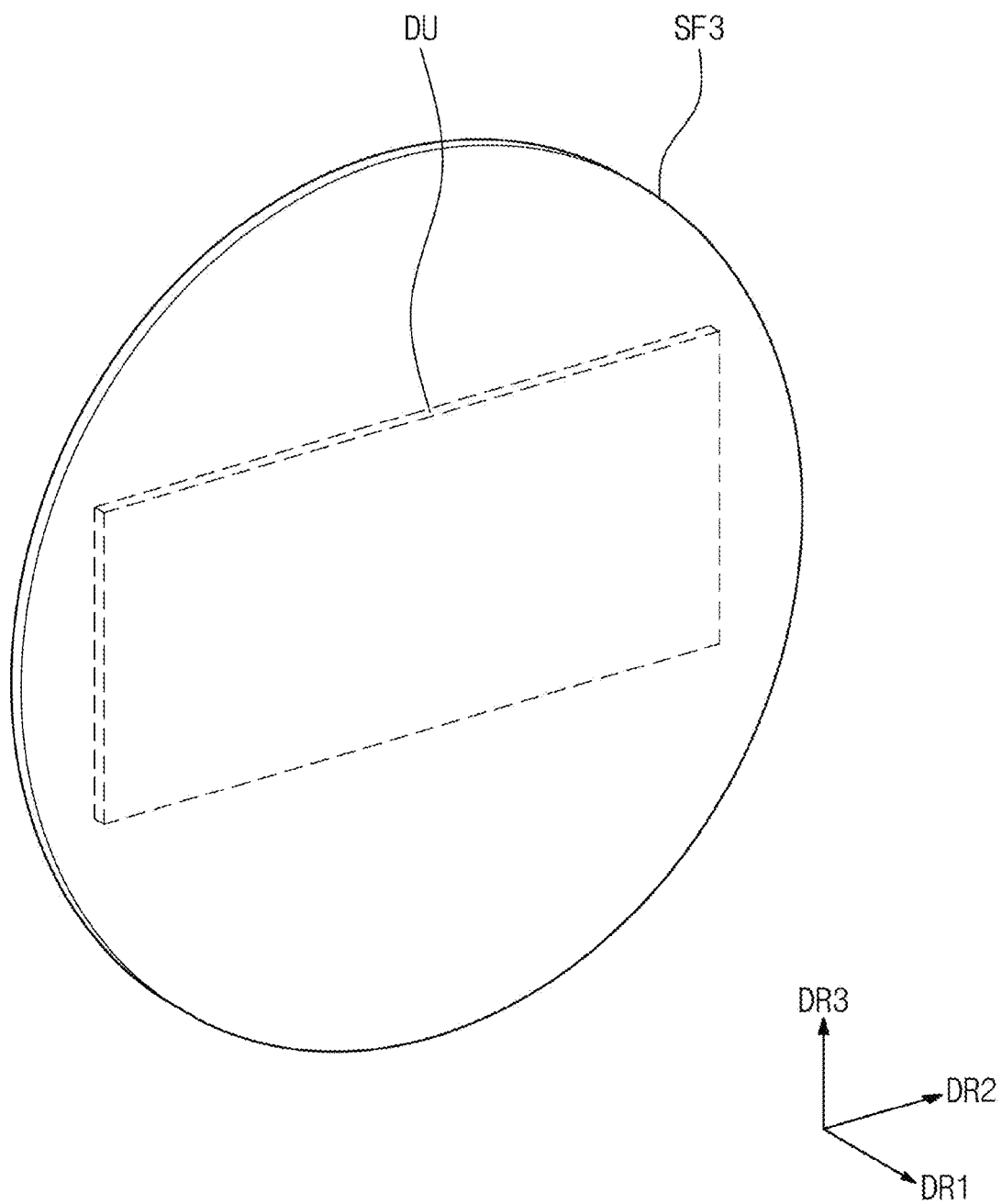
FIG. 11 is a perspective view showing a portion of a head-mounted device according to an exemplary embodiment of the present disclosure.

FIG. 11 is a perspective view showing a portion of a head-mounted device according to an exemplary embodiment of the present disclosure. FIG. 11 shows a display panel unit DU and a filter SF3.

Different from head-mounted device including the filter SF2 shown in FIG. 10, the head-mounted device shown in FIG. 11 includes one filter SF3 having a circular shape. Referring to FIG. 11, the filter SF3 is disposed spaced apart from the display panel unit DU in the first direction DR1.

The filter SF may have the circular shape. The filter SF3 may rotate with respect to an axis extending in the first direction DR1 or rotate in clockwise and counter-clockwise directions with respect to the axis extending in the first direction DR1.

Figure 12:
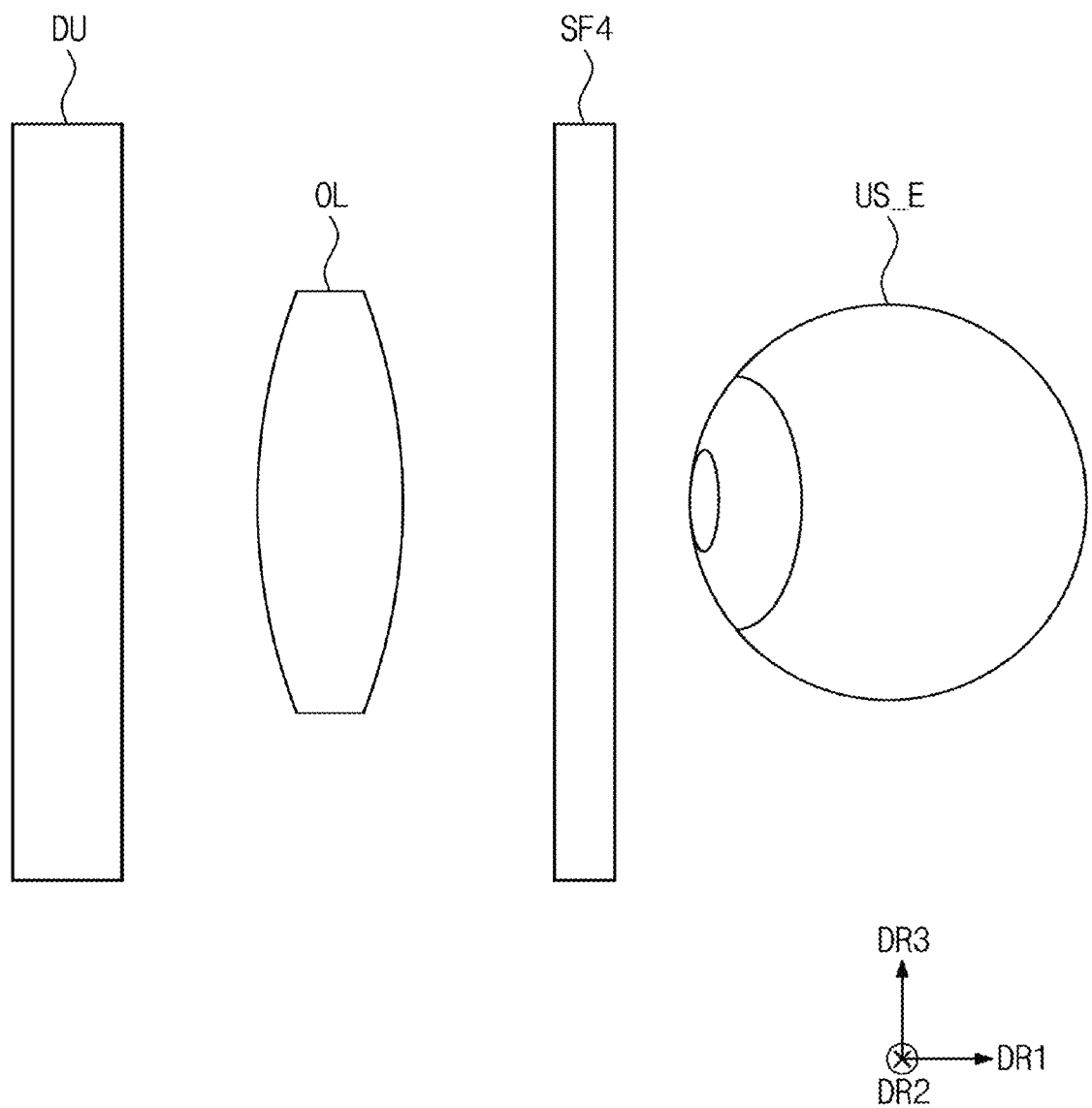
FIG. 12 is a perspective view showing a portion of a head-mounted device according to an exemplary embodiment of the present disclosure.

FIG. 12 is a perspective view showing a portion of a head-mounted device according to an exemplary embodiment of the present disclosure.

The head-mounted device shown in FIG. 12 has the same or substantially the same structure and function as those of the head-mounted device shown in FIG. 4 except for a position of the filter SF4. A display panel unit DU, an optical system OL, and the filter SF4 are sequentially arranged in the first direction DR1. That is, the optical system OL is disposed between the display panel unit DU and the filter SF4.

The filter SF4 may correspond to any one of the above-mentioned filters SF1, SF2, and SF3. The filter SF4 may repeatedly move in a direction (e.g., a predetermined direction). The filter SF4 may move repeatedly at a frequency greater than the CFF in the direction (e.g., the predetermined direction). Accordingly, the spatial noise may be converted to the temporal noise due to the repetitive movement of the filter SF4. In addition, because the filter SF4 repeatedly moves at the frequency greater than the CFF, the temporal noise may not be recognized or observed by the user.

Figure 13:
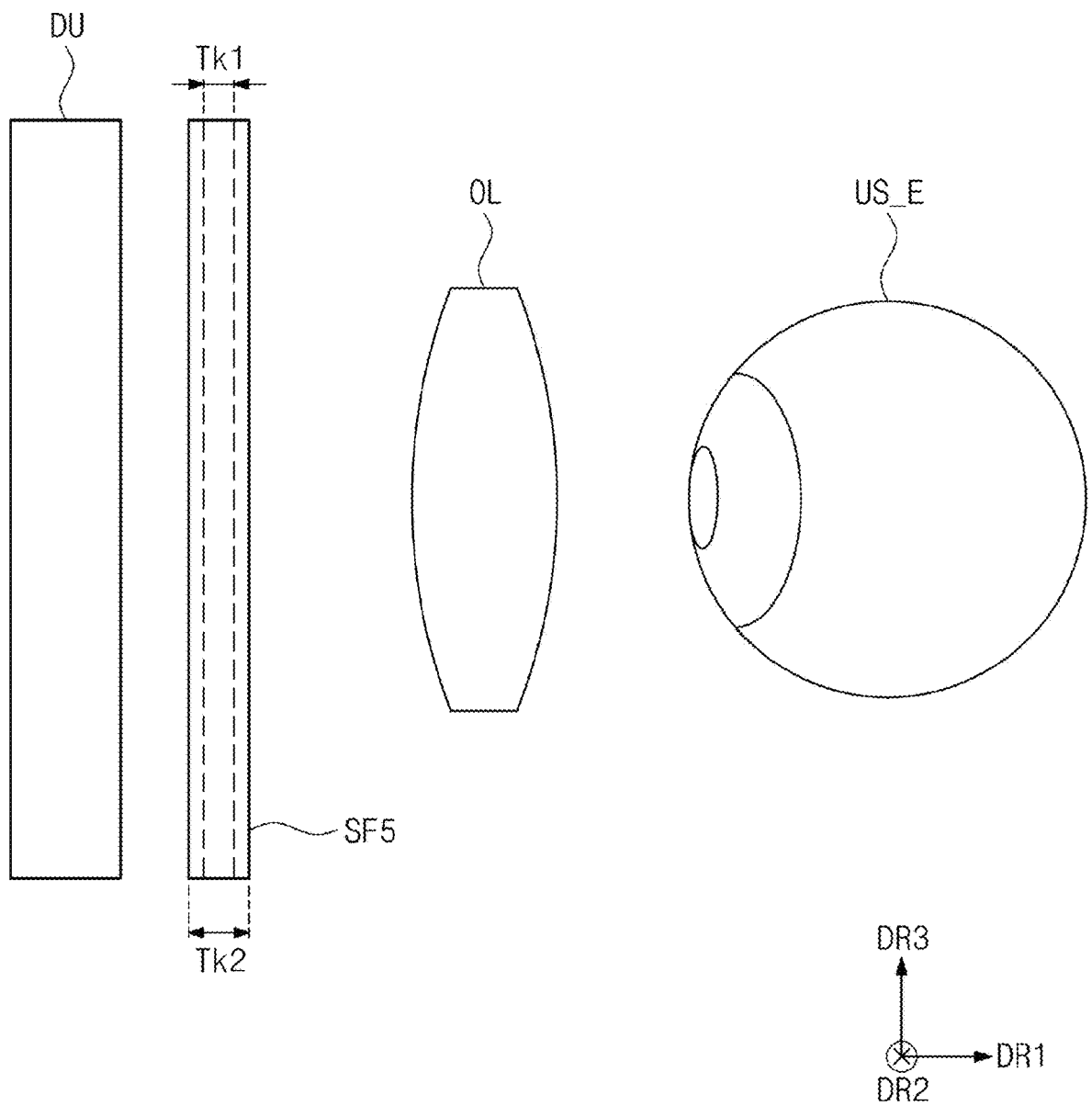
FIG. 13 is a perspective view showing a portion of a head-mounted device according to an exemplary embodiment of the present disclosure.

FIG. 13 is a perspective view showing a portion of a head-mounted device according to an exemplary embodiment of the present disclosure.

Referring to FIG. 13, a filter SF may be contracted and expanded. For example, the filter SF5 may be expanded from a first thickness Tk1 to a second thickness Tk2 or contracted from the second thickness Tk2 to the first thickness Tk1.

The filter SF5 may include a membrane and a fluid filled in the membrane. Thus, the filter SF5 may be contracted or expanded by controlling an amount of the fluid filled in the membrane from the outside, but it should not be limited thereto or thereby. For example, the filter SF may be formed of an electroactive polymer having a property in which the electroactive polymer is contracted when electrified. Accordingly, the contraction and expansion of the filter SF5 may be controlled by the electricity.

Due to the contraction and expansion of the filter SF5, an optical property of the filter SF5 may be changed. Thus, as described above, the spatial noise may be converted to the temporal noise due to the repetitive movement of the filter SF4, and the user may be prevented or substantially prevented from recognizing the temporal noise by controlling the number of contractions and expansions per second of the filter SF5.

Although exemplary embodiments of the present invention have been described, it is understood that the present invention should not be limited to these exemplary embodiments but various changes and modifications can be made by one ordinary skilled in the art within the spirit and scope of the present invention as indicated in the following claims and their equivalents.

What is claimed is:

1. A head-mounted device comprising:
   a case comprising a body and a cover covering the body, the case having a display panel accommodating space between the body and the cover;
   a display panel in the display panel accommodating space, the display panel being configured to display an image,
   an optical system in the body and facing the cover; and
   a filter in the body, the filter being spaced apart from the optical system in a first direction corresponding to a thickness direction of the optical system, the filter being positioned such that the image displayed by the display panel passes through the filter, the filter being configured to repeatedly move in a direction.

2. The head-mounted device of claim 1, wherein the filter is configured to perform a reciprocating movement in a direction perpendicular to the first direction.

3. The head-mounted device of claim 1, wherein the filter is configured to rotate with respect to an axis extending in the first direction.

4. The head-mounted device of claim 1, wherein the filter is configured to perform a reciprocating movement in a clockwise direction and a counter-clockwise direction with respect to an axis extending in the first direction.

5. The head-mounted device of claim 1, wherein the filter is configured to be contracted and expanded to allow a thickness in the first direction thereof to be changed.

6. The head-mounted device of claim 1, wherein the filter is configured to repeatedly move at an operating frequency that is higher than a critical fusion frequency.

7. The head-mounted device of claim 1, wherein the filter is configured such that an operating frequency of the filter is variable in accordance with a user's request.

8. The head-mounted device of claim 1,
   wherein the optical system comprises:
      a left-eye optical system; and
      a right-eye optical system spaced apart from the left-eye optical system in a second direction crossing the first direction, and
   wherein the filter comprises:
      a left-eye filter spaced apart from the left-eye optical system in the first direction; and
      a right-eye filter spaced apart from the right-eye optical system in the first direction.

9. The head-mounted device of claim 1,
   wherein the filter is between the display panel and the optical system.

10. The head-mounted device of claim 1, wherein the optical system is between the display panel and the filter.

11. The head-mounted device of claim 1, wherein the filter has a polygonal shape.

12. The head-mounted device of claim 1, wherein the filter has a round shape.

13. A head-mounted device comprising:
   a case comprising a body and a cover covering the body, the case having a display panel accommodating space between the body and the cover;
   an optical system in the body and facing the cover; and
   a filter in the body, the filter being spaced apart from the optical system in a first direction corresponding to a thickness direction of the optical system and being configured to repeatedly move in a direction,
   wherein the filter is configured to perform a reciprocating movement in the first direction.

* * * * *